United States Patent [19]

Dragotta

[11] 4,209,899

[45] Jul. 1, 1980

[54] MEDICINE DROPPER CAP AND BULB ASSEMBLY APPARATUS

[76] Inventor: Peter Dragotta, 4 Bodie Rd., Wayne, N.J. 07470

[21] Appl. No.: 2,680

[22] Filed: Jan. 11, 1979

[51] Int. Cl.³ .................... B23P 19/00; B23P 21/00
[52] U.S. Cl. .................... 29/783; 29/786; 29/790
[58] Field of Search .................... 10/155 R, 155 A; 29/235, 235.5, 773, 776, 783, 786, 789, 790, 792, 797, 809; 198/624, 625

[56] References Cited

U.S. PATENT DOCUMENTS

| | | | |
|---|---|---|---|
| 2,280,665 | 4/1942 | Schmitter | 29/789 X |
| 2,602,555 | 7/1952 | Hutaff | 198/624 X |
| 3,005,255 | 10/1961 | Wilson | 29/783 |
| 3,103,023 | 9/1963 | Zdanis | 29/790 X |
| 3,163,927 | 1/1965 | Brosseit | 29/792 X |
| 3,180,014 | 4/1965 | Maximoff et al. | 29/790 X |
| 3,328,873 | 7/1967 | Schweers | 29/790 X |
| 3,378,907 | 4/1968 | Dixon | 29/792 X |
| 3,634,920 | 1/1972 | Maguire | 29/790 X |
| 3,750,256 | 8/1973 | Elmer | 29/783 X |
| 4,170,820 | 10/1979 | Klose | 29/789 |

*Primary Examiner*—Ervin M. Combs
*Attorney, Agent, or Firm*—Norman N. Popper; Daniel H. Bobis

[57] ABSTRACT

A medicine dropper cap and bulb assembly apparatus including a first orientation means for positioning the caps for delivery to a chute for insertion of a bulb at an assembly station; a second orientation means for medicine dropper bulbs to be positioned for insertion into a cap and delivery to the assembly station; a rod for driving the bulbs into seating engagement on the caps.

10 Claims, 11 Drawing Figures

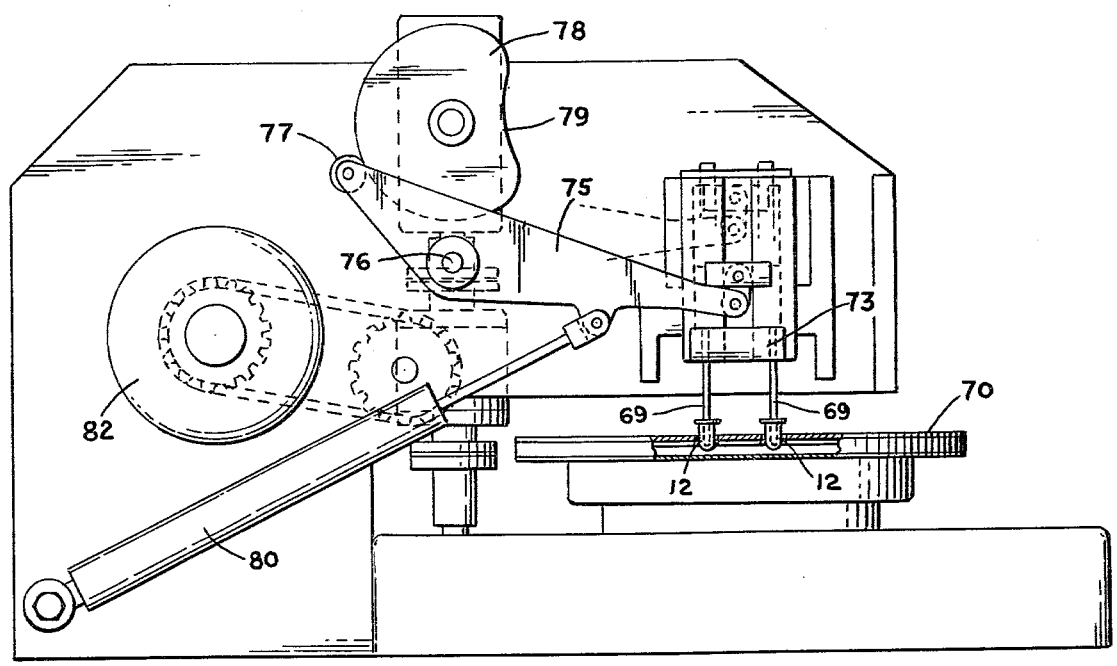
FIG. 4
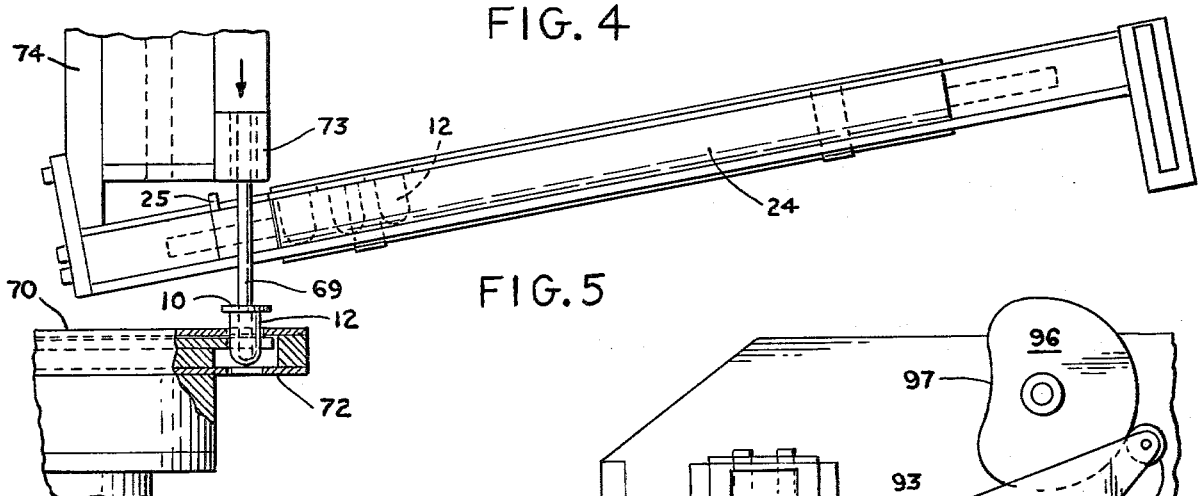
FIG. 5
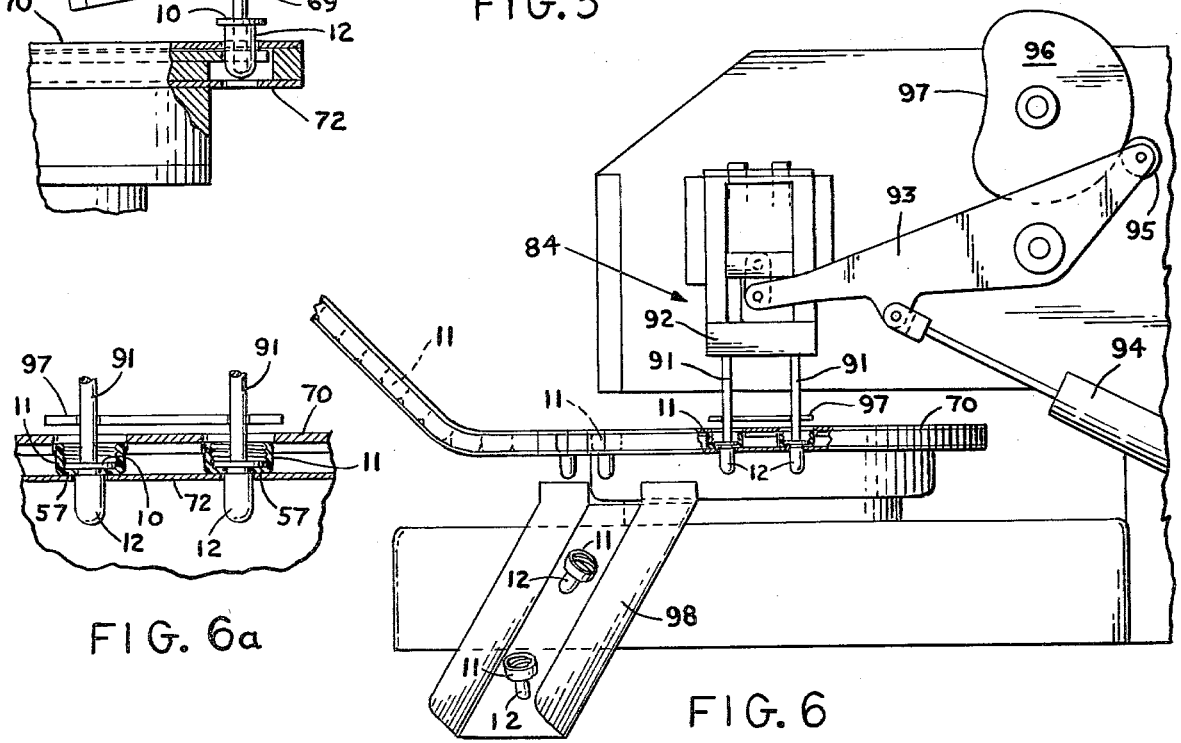
FIG. 6a
FIG. 6

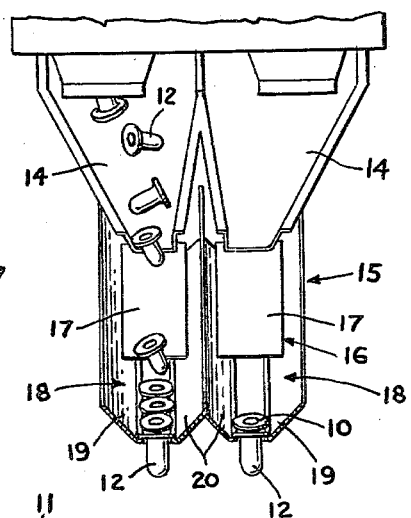
FIG. 7
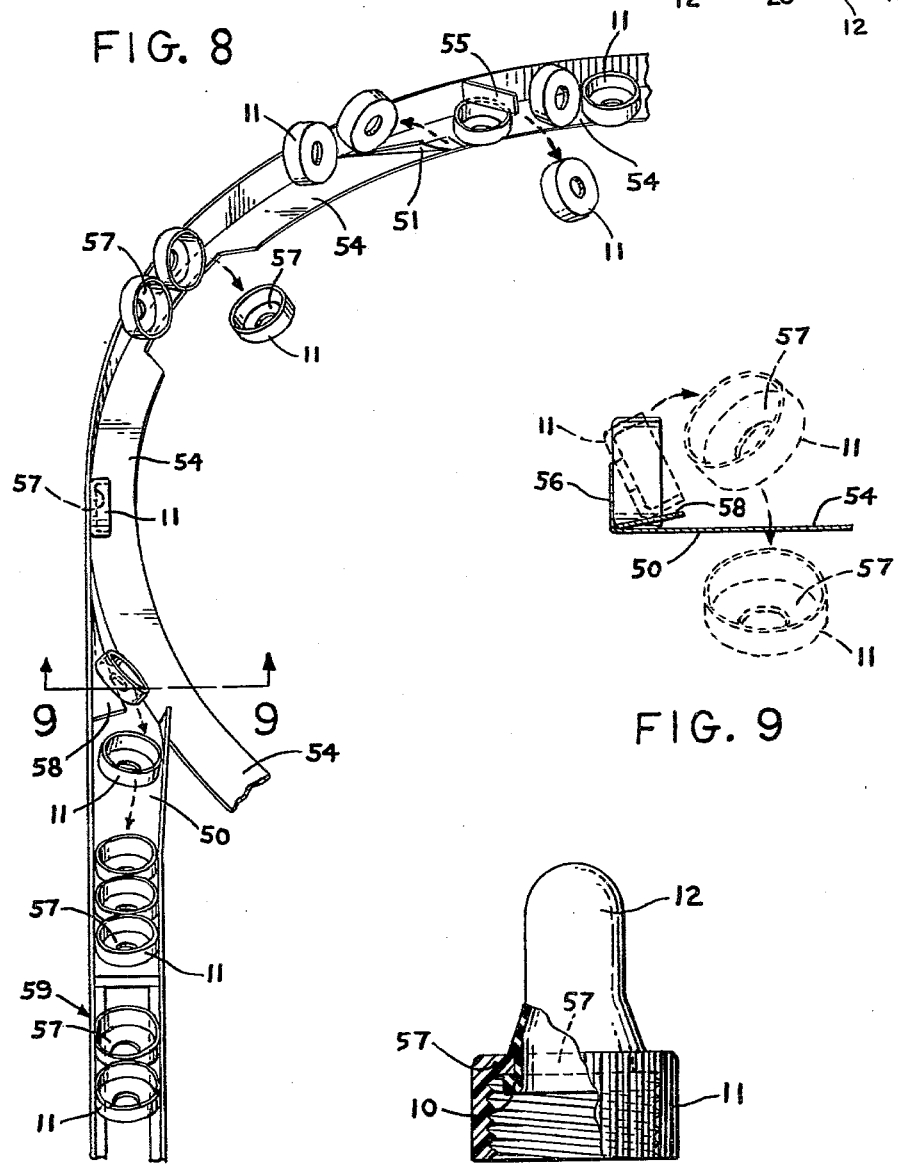
FIG. 8
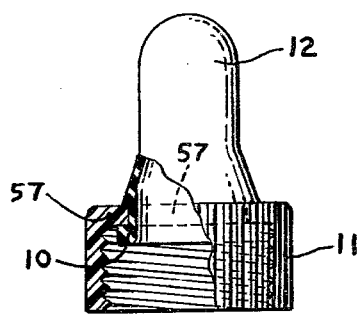
FIG. 9
FIG. 10

4,209,899

MEDICINE DROPPER CAP AND BULB ASSEMBLY APPARATUS

BACKGROUND OF THE INVENTION

1. Field of the Invention

This invention relates generally to a medicine dropper cap and bulb assembly apparatus, and particularly to such an apparatus wherein the bulbs and caps are oriented for assembly, without the use of lubricants or other materials that would contaminate the medicine dropper assembly.

2. Prior Art

The assembly of medicine dropper caps and bulbs is now usually performed manually. Productivity is slow and labor costs are high. The elastomeric bulbs are difficult to handle. The design of apparatus to automatically assemble the bulbs and the caps has encountered the problem of automatically orienting the caps and bulbs to be fed in proper position for assembly. The elastomeric bulbs have a high coefficient of friction and do not consistently achieve proper orientation by conventional feeding means. The addition of lubricants such as silicone, to reduce the inter-bulb frictional engagement is not acceptable because such lubricants contaminate the bulbs and render medicaments dispensed in dropper bottles impure. The removal of the contaminating silicone lubricants from the bulbs, if used, is difficult, cannot be performed completely. It has therefore been sought for a long period of time to create a medicine dropper cap and bulb assembly apparatus which is automatic and speedy, and does not need lubricants.

SUMMARY OF THE INVENTION

It has been found that an automatic medicine dropper cap and bulb assembly apparatus can be provided which efficiently assembles the caps and bulbs of a medicine dropper without resorting to any materials which might contaminate the assembly. This is accomplished by providing a cap feed assembly and a separate bulb feed assembly in which the caps are vibrated and delivered to a delivery chute with their open face disposed upwardly and their flange downwardly. They ride into an intermittently rotating turret, where they are carried to a bulb inserting station.

There is also a dropper bulb feed wherein randomly arranged bulbs, uncontaminated by any lubricant, are vibrated into a channel, from which channel they move into a pair of upwardly and outwardly revolving rods, on which the bulbs ride to an assembly station, being restrained from moving upwardly out from between the revolving rods by a cover which supplies only sufficient clearance for the flanges on the bulbs to ride above the revolving rods. A rod drives the bulbs into partial seating engagement with the caps. A second rod drives the bulbs into complete seating engagement with the flange on the caps. No contaminants or lubricants are needed to accomplish this object.

DRAWINGS

These objects and advantages as well as other objects and advantages may be obtained by the device shown by way of illustration in the drawings in which:

FIG. 4 is an elevational view of driving means for the inserter rods;

FIG. 5 is a side elevational view of the bulb inserter;

FIG. 6 is a side elevational view taken on the line 6—6 in FIG. 1, looking in the direction of the arrows;

FIG. 6a is a cross-sectional view showing the cap and bulb assembly;

FIG. 7 is a cross-sectional view taken on line 7—7 of FIG. 1;

FIG. 8 is a perspective view of the cap feed delivery;

FIG. 9 is a cross-sectional view taken on line 9—9 of FIG. 8, looking in the direction of the arrows; and FIG. 10 is a partial sectional view of the assembled dropper and cap.

PREFERRED EMBODIMENT

Figure 1:
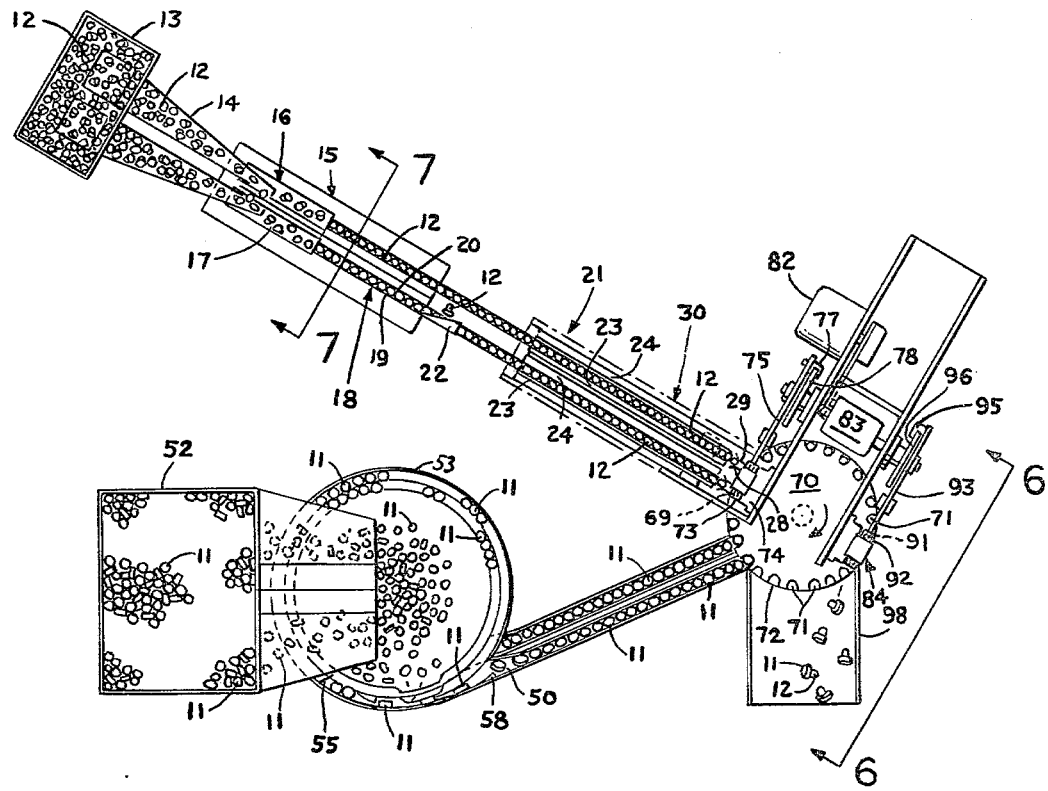
FIG. 1 is a top plan view of the assembly apparatus showing the feed for the caps, the feed for the bulbs, and the revolving turret at the assembly station.
Figure 2:
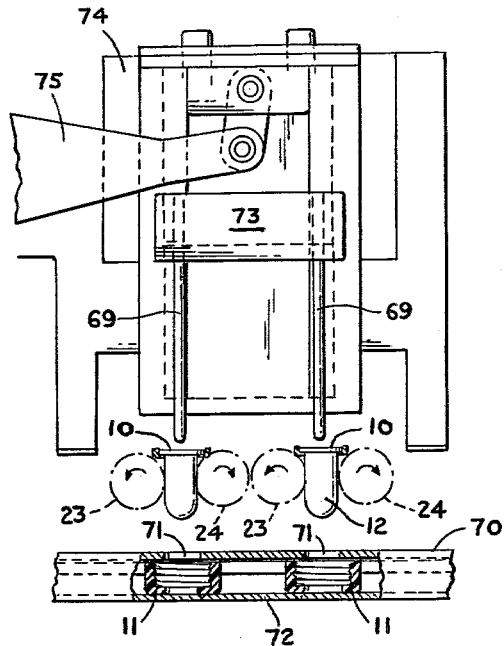
FIG. 2 is an elevational view of the inserter rod assembly.
Figure 3:
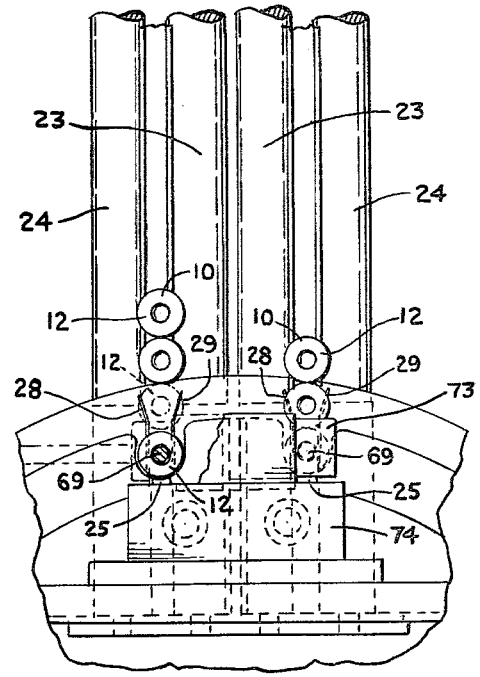
FIG. 3 is a top plan view of the revolving rollers that deliver the bulbs to the assembly station.

The apparatus for assembling medicine dropper caps and bulbs provides two separate feed systems; first a feed system for caps, and secondly a feed system for dropper bulbs. These feed systems deliver the caps and the bulbs to an assembly station where they are put together.

THE DROPPER BULB FEED

Each assembly consists of a cap 11 and a squeezable elastomeric bulb 12. This bulb 12 is generally cylindrical with a flange 10 at the open end. The bulbs 12 are placed in a hopper 13 which delivers them to a vibrating tray 14. From this first vibrating tray 14, the bulbs dance off into a tilted conduit 15. The first section 16 of the conduit 15 has a flat floor 17 which leads the bulbs 12 into a second channeled section 18. The first section 16 receives the bulbs 12 randomly disposed, and it vibrates to jiggle the bulbs downwardly toward the second section 18. The second section 18 has a channel of sufficient width between its side walls 19, 20 to receive the squeezable portion of the bulb, but insufficiently wide to receive the flange 10 on the bulb 12. Thus, a bulb 12 will move toward the channel defined by the walls 19, 20, and the squeezable portion of the bulb 12 will drop into the channel. The second section 18 will support the bulb on its flange 10 which will rest upon the top of the vertical walls 19, 20.

As the second section 18 vibrates, the bulbs progress toward a deflector 22. Any misoriented bulb 12, which did not drop normally into the channel, will encounter the deflector 22, which will deflect it out of the channel, leaving only remaining the properly oriented bulbs 12. The bulbs 12 then proceed into a third section 21 of the conduit which consists of a pair of rollers 23, 24, spaced apart sufficiently to receive the bulbs 12 between the rollers 23, 24, but insufficiently to permit the flange 10 on a bulb to gravitationally pass down between the rollers 23, 24. These rollers 23, 24 are driven upwardly and outwardly so as to support the flange 10 on the rollers 23, 24. Since the rollers 23, 24, like the channel, are tilted, the bulbs 12 will move gravitationally toward an assembly station which will be hereinafter referred to. At the assembly station, there is a stop 25 which prevents the bulbs 12 from dropping off of the rotating rollers until they are inserted into the caps 11. The third portion consisting of the rotating rollers 23, 24 is covered over by a transparent plate 30 so that the bulbs are not driven upwardly and off of the rollers. A motor drives a chain connected to the rotating rollers 23, 24. A pair of arms 28, 29 adjacent to the stop 25 embrace the bulb 12 below the flange 10 to keep the bulb 12 with its central axis vertically disposed. The bulb 12 orientation and delivery system is thus provided for and the bulb 12 is positioned for insertion in the cap 11.

THE DROPPER CAP FEED

The dropper caps 11, separately, are placed in a hopper 52 from which they fall into a vibrating bowl 53. The bowl 53 is provided with a track 54. Vibration of the bowl 53 causes the caps 11 to march onto the track. A height bar 55 over the track 54 will discharge from the track 54, any caps which are misoriented on their sides. The caps 11 (laying flat) continue to move toward a narrowed section of the track defined by a wall 56. A turnover stop 51 will cause the caps 11 to turn over on their side. The caps 11 are vibrated on their side toward a delivery chute 59. The caps 11 have one side which is open, and their other side has an annular flange 57 surrounding the bulb opening. The side with the annular flange 57 is heavier than the open side. As the caps 11 march along the vibrating track, those caps 11 with the annular flange 57 facing inwardly are unbalanced (they are heavier on the side with the flange 57) and fall off of the narrowed portion of the track 54, leaving only the caps with the annular flange 57 facing outwardly from the center of the bowl on the track 54. These caps 11 having been vibrated past the "fall-off" point, encounter a deflector 58 which causes them to fall 90° into a widened portion 50 of the track 54 where they are all oriented with their flange 57 downwardly, ready for the insertion of the bulb 12. The caps are then vibrated further down the track into a delivery chute 59 where they descend gravitationally and are delivered to a rotating horizontal turret 70 having pockets 71 dimensioned to receive the caps 11.

PARTIAL ASSEMBLY STATION

The caps 11 and the bulbs 12 have now arrived at a partial assembly station. The assembly turret 70 is a disk having a plurality of holes defining a space for a bulb to enter a cap pocket 71. The turret 70 rotates intermittently and upon arriving opposite to the cap delivery chute 59, it presents a pocket 71 into which a properly oriented cap 11 will gravitationally leave the chute 59 and enter the pocket 71. Underneath the pocket, there is a plate 72 which sustains the caps from falling through the pocket. This plate 72 retains the cap during the assembly operation until it is complete. The turret 70 then revolves to the insertion station at which point it stops with a bulb 12 which is being held on the rollers 23, 24 in registration with the opening in the cap. A rod 69, or inserter, is mounted above the bulb 12, and moves downwardly into the bulb 12. Since the bulb 12 is elastomeric, the bulb 12 has its flange 10 bent inwardly as it is pressed down into the opening in the cap 11 and the flange 10 on the bulb 12 moves below the rollers 23, 24. The inserter or rod 69 is withdrawn and the turret 70 containing the cap 11 and bulb 12 in the cap pocket 71 is revolved onwardly toward a final assembly station. A hole in a stripper plate defines the entry into the cap pocket 71 and has a diameter less than the diameter of the flange 10 on the bulbs 11 so the bulbs cannot escape upwardly from the cap 11. The bulb 12 is now partially seated in the hole in the cap 11. The inserter 69 is mounted on a carriage 73. This carriage 73 slides on a channeled holder 74 and is capable of reciprocating on this holder 74. The carriage is pivotably attached to a rocker arm 75. The arm 75 is mounted on a pivot 76. The arm also carries a cam follower 77. This cam follower 77 rides on a cam 78 having a cut out portion 79 which reciprocates the rocker arm 75 in timed relation to the position of the pockets 71 in the turret 70. The inserter 69 or rod is normally maintained spaced away from the pockets 71 by the cam 78. When the cam follower 77 reaches the cut out portion 79 of this revolving cam 78, a spring 80 pivots the arm 75 to drive the inserter 69 to push the bulb 12 into the cap 11. The cam 78 is driven by a motor 81 through a speed reducer 83. The motor 82 is connected to rotate the turret 70 intermittently until a partially assembled cap 11 and bulb 12 arrive at a final (second) insertion station 84.

FINAL ASSEMBLY STATION

At this point, a second rod 91 mounted on a carriage 92 will drive the bulb 12 into full seated position on the cap 11. The carriage 92 is reciprocated by a pivotably mounted second rocker arm 93. A spring 94 normally urges the rocker arm 93 to move the carriage 92 to drive the rod 91 to insert the bulb 12 into the cap 11. This rocker arm 93 is provided with a cam follower 95 which engages a second cam 96 which overcomes the spring 94 normally to keep the rod 91 away from the bulb 12 and cap 11. When the cam follower 95 reaches a cut out portion 97 of the cam 96, the rocker arm 93 yields to the spring 94 and performs the final inserting operation, pressing the bulb 12 until the flange 10 is fully seated on the flange 57. The rod 91 is withdrawn. A second stripper plate 97 retains the assembly in the cap pocket. Upon the next step of rotation of the turret 70, the completely assembled cap 11 and bulb 12 rides off the support plate 72 and falls into a discharge chute 98. The demand for bulbs may be governed by a series of electric lamps and light sensing eyes which govern a control circuit, to turn on and off the vibrating delivery chutes, as the supply of bulbs and caps delivered to the assembly station become exhaustive.

By reason of the bulb 12 delivery and orientation system, it is not necessary to resort to any conditioning materials such as silicone lubricants in order to accomplish the orientation and delivery of the bulbs 12 to the assembly station. Such lubricants and conditioning materials are incompatible with the ultimate use of the medicine dropper assembly in that they contaminate the medicines which may be included in a bottle having a dropper assembly. Even the most rigorous washing procedures are often insufficient to remove all traces of lubricant or conditioning apparatus that ordinarily might be thought to be necessary in order to provide for the assured delivery of bulbs to the assembly station. Furthermore, such attempted removal of conditioning materials would be exceedingly costly and could not be carried out with maximum efficiency. The present apparatus provides for the delivery of bulbs 12 without the use of any accessory materials that would contribute to contamination.

While I have referred to a bulb 12 with a flange 10, it is noted that these bulbs may be provided with a channel or even a second flange. The flange 57 on the cap 11 will serve to seat the flange 10 on the bulb 12. If the bulb 12 is provided with a channel adjacent to the flange 10, this channel may serve as a seat for the flange 10 on the bulb. Or indeed, the flange 57 on the cap may be embraced by the two flanges on the bulb 12. This takes place at the final assembly station.

I claim:

1. In an apparatus for assembling medicine dropper caps and elastomeric dropper bulbs, said apparatus including means for feeding said bulbs to a downstream partial assembly station comprising,
   (a) a conduit for conveying said elastomeric dropper bulbs having a radial flange at an open end,
   (b) a pair of tilted, rotatably mounted rods in spaced relation to each other,
   (c) the space between the rods defining a place for the elastomeric bulb to fall into,
   (d) the space between the rods further defining a space insufficient for radial flange at the open end of the bulb to pass through, and
   (e) a means to contra-rotate the rods with their opposite surfaces moving upwardly and outwardly whereby the flange on the bulbs ride on the rods thereby moving the bulbs on the rods in the direction of the tilt,
   (f) wherein said conduit has a bulb discharge end positioned over an upper end of the tilted rods to discharge dropper bulbs on to the rods to fall therethrough up to the radial flange thereon for subsequent movement thereon to said downstream partial assembly station.

2. In a medicine dropper cap and bulb assembly apparatus according to claim 1 and further comprising,
   (g) a cover in spaced relation to the rods offering sufficient clearance for the flanges on the bulbs to pass under the cover, but insufficient clearance for the bulbs to rise out from between the rotating rods.

3. In a medicine dropper cap and bulb assembly apparatus according to claim 2 and further comprising,
   (h) a stop at the end of the rods to hold the bulbs at said partial assembly station,
   (i) a pair of arms below the rods in spaced relation to each other to receive a bulb and hold it from lateral deviation from its position between the rods.

4. In a medicine dropper cap and bulb assembly apparatus according to claim 3 and further comprising,
   (j) a rod in general axial registration with the bulb,
   (k) a means to reciprocate the rod to enter the bulb, and peripherally deform the flange to move it down below the rods, and to push the bulb into an opening in a cap, at a partial assembly station.

5. In a medicine dropper cap and bulb assembly apparatus according to claim 4 and further comprising,
   (l) a means to deliver a flanged cap with an opening in registration with the bulb, and the flange on the cap disposed downwardly whereby the rod pushes the bulb into the opening of the flanged cap.

6. In a medicine dropper cap and bulb assembly apparatus according to claim 5 wherein,
   the means (l) to deliver the flanged cap in registration with the bulb comprises:
   (I) a rotatable turret,
   (II) a plurality of cap pockets disposed peripherally in the turret, and
   (III) a means to rotate the turret intermittently in correspondence with the means to reciprocate the rod, firstly to a partial assembly station, secondly to a final assembly station, and thirdly to a discharge station.

7. In a medicine dropper cap and bulb assembly apparatus according to claim 6 and further comprising,
   (m) a second rod in general axial registration with the bulb at a final assembly station, and
   (n) a second means to reciprocate the second rod at a final assembly station whereby the second rod pushes the bulb into the opening in the flanged cap to seat the flange on the bulb on the flange on the cap.

8. In a medicine dropper cap and bulb assembly apparatus according to claim 4 wherein,
   the means (k) to reciprocate the rod comprises:
   (I) a pivotably mounted arm,
   (II) a cam,
   (III) a cam follower on the arm engaged with the cam, and
   (IV) a means to drive the cam.

9. In a medicine dropper cap and bulb assembly apparatus according to claim 7 wherein,
   the second means (n) to reciprocate the second rod comprises:
   (I) a second pivotably mounted arm,
   (II) a second cam, and
   (III) a cam follower on the second pivotably mounted arm,
   wherein the means to drive the cam is also operably connected to drive the second cam.

10. In a medicine dropper cap and bulb assembly apparatus according to claim 5 wherein,
    the means (l) to deliver the flanged cap with an opening in registration with the bulb and the flange on the cap disposed downwardly comprises:
    (I) a vibrating track in a bowl upon which the caps move,
    (II) a height bar over the track to discharge caps on their sides, but to pass caps laying flat,
    (III) a turnover stop in the track to turn caps onto their side,
    (IV) a narrowed section on the track to discharge unbalanced caps with their flange facing inwardly and retain caps with their flange facing outwardly,
    (V) a deflector on the track to cause the remaining caps to turn on their back with their flange at the bottom, positioned to receive the insertion of a bulb, and
    (VI) a delivery chute to supply the cap to the means to deliver the cap to a position in registration with a bulb.

* * * * *